United States Patent
Nakamoto (10) Patent No.: US 9,142,856 B2
(45) Date of Patent: Sep. 22, 2015

(54) LIQUID HYDROPHOBIC PHASE TRANSITION SUBSTANCE, AND BATTERY COMPRISING SAME

(75) Inventor: Hirofumi Nakamoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 172 days.

(21) Appl. No.: 13/521,152

(22) PCT Filed: Jan. 12, 2010

(86) PCT No.: PCT/JP2010/050234
§ 371 (c)(1),
(2), (4) Date: Aug. 8, 2012

(87) PCT Pub. No.: WO2011/086664
PCT Pub. Date: Jul. 21, 2011

(65) Prior Publication Data
US 2013/0095388 A1 Apr. 18, 2013

(51) Int. Cl.
| | |
|---|---|
| H01M 4/13 | (2010.01) |
| H01M 4/62 | (2006.01) |
| H01M 10/052 | (2010.01) |
| H01M 10/0562 | (2010.01) |
| H01M 12/06 | (2006.01) |
| H01M 12/08 | (2006.01) |
| H01M 6/24 | (2006.01) |
| H01M 10/42 | (2006.01) |

(Continued)

(52) U.S. Cl.
CPC ............. *H01M 10/052* (2013.01); *H01M 4/13* (2013.01); *H01M 4/62* (2013.01); *H01M 6/24* (2013.01); *H01M 10/056* (2013.01); *H01M 10/0561* (2013.01); *H01M 10/0562* (2013.01); *H01M 10/4235* (2013.01); *H01M 12/06* (2013.01); *H01M 12/08* (2013.01); *H01M 2300/0025* (2013.01); *H01M 2300/0068* (2013.01); *H01M 2300/0091* (2013.01); *H01M 2300/0094* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | |
|---|---|---|
| 2004/0241543 A1 | 12/2004 | Miyake et al. |
| 2005/0175867 A1 | 8/2005 | Adachi et al. |

(Continued)

FOREIGN PATENT DOCUMENTS

| | | |
|---|---|---|
| EP | 1 906 481 A1 | 4/2008 |
| JP | A-2004-119278 | 4/2004 |
| JP | A-2004-292350 | 10/2004 |

(Continued)

OTHER PUBLICATIONS

Henderson et al. "Phase Behavior and Conductivity of Et4NTFSI-LiTFSI Mixtures—A Model System for Ionic Liquid Lithium Battery Electrolytes", ECS Trans. 2008, vol. 11, Issue 29, pp. 115-118.*

(Continued)

*Primary Examiner* — Gregg Cantelmo
(74) *Attorney, Agent, or Firm* — Oliff PLC (57) ABSTRACT

A liquid hydrophobic phase transition substance is provided that may improve the safety of a battery and restrain the deterioration in performance of the battery without deteriorating the properties of the battery. The liquid hydrophobic phase transition substance includes a hydrophobic salt having a melting point of 80° C. or more and a hydrophilic salt of an alkali or an alkaline earth.

8 Claims, 4 Drawing Sheets

(51) Int. Cl.
*H01M 10/056* (2010.01)
*H01M 10/0561* (2010.01)

(56) References Cited

U.S. PATENT DOCUMENTS

2007/0054193 A1  3/2007  Ota
2009/0246625 A1  10/2009 Lu

FOREIGN PATENT DOCUMENTS

| JP | 2004342575 A | * | 12/2004 |
| JP | A-2005-116317 | | 4/2005 |
| JP | A-2005-116367 | | 4/2005 |
| JP | A-2005-149982 | | 6/2005 |
| JP | A-2008-171588 | | 7/2008 |
| JP | A-2009-117168 | | 5/2009 |
| JP | A-2009-146800 | | 7/2009 |
| JP | A-2009-218005 | | 9/2009 |
| WO | WO 03/106419 A1 | | 12/2003 |

OTHER PUBLICATIONS

IPDL Machine Translation of the Detailed Description of JP 2004-342575A (Dec. 2004).*

International Search Report issued in International Patent Application No. PCT/JP2010/050234 dated Apr. 13, 2010.

Herstedt et al., "Conformational isomerism and phase transitions in tetraethylammonium bis(trifluoromethanesulfonyl)imide Et$_4$NTFSI," *Journal of Molecular Structure*, 2006, pp. 145-156, vol. 783.

Matsumoto et al., "Room Temperature Molten Salts Based on Tetraalkylammonium Cations and Bis(trifluoromethylsulfonyl)imide," *Chemistry Letters*, 2001, pp. 182-183.

Sun et al., "Room-Temperature Molten Salts Based on the Quarternary Ammonium Ion," *J. Phys. Chem. B*, 1998, pp. 8858-8864.

* cited by examiner

ELECTROLYTE (COLORLESS AND TRANSPARENT LIQUID)

FIG. 9B

ELECTROLYTE (WHITE SOLID)

FIG. 10

DEPENDENCE OF $H_2S$ GENERATION AMOUNT ON TIME

FIG. 11

DIRECT CURRENT POLARIZATION CURVE
OF LIQUID ELECTROLYTE

LIQUID HYDROPHOBIC PHASE TRANSITION SUBSTANCE, AND BATTERY COMPRISING SAME

TECHNICAL FIELD

The present invention relates to a liquid hydrophobic phase transition substance which may improve the safety of a battery and restrain the deterioration in performance of the battery without deteriorating the properties of the battery.

BACKGROUND ART

In accordance with a rapid spread of information relevant apparatuses and communication apparatuses such as a personal computer, a video camera and a portable telephone in recent years, the development of the battery to be utilized as a power source thereof has gained recognition. The development of the high-output and high-capacity battery for an electric automobile or a hybrid automobile has been advanced also in the automobile industry.

The battery having an electrolyte and a pair of electrodes holding the above-mentioned electrolyte therebetween is used as such a battery. Further, metallic lithium and a sulfide-based solid electrolyte have been widely used as a material composing the electrodes and the electrolyte.

However, the above-mentioned metallic lithium and sulfide-based solid electrolyte have properties of reacting with water, and the problem is that heat is generated by contacting with water and performance is deteriorated in accordance with the generation of hydrogen sulfide.

To respond such a problem, in the field of an air battery using oxygen as a cathode active material and metallic lithium as an anode layer, a method for restraining metallic lithium from contacting with water by using as an electrolyte a hydrophobic nonaqueous liquid electrolyte, which transmits oxygen and water with difficulty, is disclosed (Patent Literature 1).

In the field of a sulfide-based solid state battery comprising a solid electrolyte layer having a sulfide-based solid electrolyte, a method for coating a power generating element comprising the above-mentioned solid electrolyte layer and a cathode and an anode for holding this therebetween with an ionic liquid is disclosed in Patent Literature 2.

In order to improve the air tightness of the battery, a method for using a predetermined gasket material is disclosed in Patent Literature 3.

Further, Patent Literature 4 discloses a lithium battery comprising a cathode laminated body and an anode laminated body, in which the cathode laminated body and the anode laminated body are laminated, and an intervention layer made of an ionic liquid between both of the laminated bodies for the purpose of improving the adhesion properties of the above-mentioned two laminated bodies.

However, the above-mentioned hydrophobic nonaqueous electrolyte used in the above-mentioned Patent Literature 1 is liquid in the use temperature of the battery for the reason that the melting point thereof is 60° C. or less. Thus, even though the hydrophobic nonaqueous electrolyte has a hydrophobic property, moisture may not be prevented from mixing in and water mixes into the electrolyte (liquid) with the passage of time. Accordingly, in the method using the above-mentioned hydrophobic nonaqueous liquid electrolyte, the problem is that moisture may not sufficiently be prevented from mixing in.

The ionic liquid used in the above-mentioned Patent Literature 2 is liquid, so that water necessarily mixes in by the distribution coefficient of water, and the problem is that moisture may not sufficiently be prevented from mixing into the above-mentioned solid electrolyte layer. Further, the solid electrolyte layer is soaked in the ionic liquid having no ion used for the battery, such as $Li^+$ in a lithium battery, $Na^+$ in a sodium battery and $Ca^{2+}$ in a calcium battery, so that there lies a problem in that the properties of the battery are deteriorated due to resistance increase caused by mixing in of the ionic liquid. In addition, an ionic liquid having chloroaluminate and tetrafluoroborate has been used as the ionic liquid used in the above-mentioned Patent Literature 2, and there is a problem in that these are inappropriate as a material for preventing moisture from mixing in by reason of having a hydrophilic property to promote the mixing in of moisture.

In the method disclosed in the above-mentioned Patent Literature 3, the problem is that it is difficult to completely restrain moisture from mixing in and no effects are exhibited in the case where moisture mixes in during production.

Further, the ionic liquid used in the above-mentioned Patent Literature 4 is liquid as described above, so that the problem is that water may not sufficiently be restrained from mixing in, similarly to the above-mentioned Patent Literature 2.

CITATION LIST

Patent Literature

Patent Literature 1: Japanese Patent Application Publication Laid-Open (JP-A) No. 2005-116317
Patent Literature 2: JP-A No. 2009-117168
Patent Literature 3: JP-A No. 2009-146800
Patent Literature 4: JP-A No. 2008-171588

SUMMARY OF INVENTION

Technical Problem

The present invention has been made in view of the above-mentioned problems, and a main object thereof is to provide a liquid hydrophobic phase transition substance which may improve the safety of a battery and restrain the deterioration in performance of the battery without deteriorating the properties of the battery.

Solution to Problem

In order to solve the above-mentioned problems, the present invention provides a liquid hydrophobic phase transition substance comprising a hydrophobic salt having a melting point of 80° C. or more and a hydrophilic salt of an alkali or an alkaline earth, and by being liquid.

According to the present invention, the liquid hydrophobic phase transition substance comprises the hydrophobic salt having a melting point of 80° C. or more and the hydrophilic salt of an alkali or an alkaline earth, and the melting point of the above-mentioned hydrophobic salt is depressed, so that the hydrophobic salt is liquid at room temperature, which is the operating temperature of the battery and is namely, 60° C. or less, and may have a phase-transition from a liquid to a solid in the case of contacting with water for the reason that the above-mentioned hydrophobic salt is hydrophobic.

Thus, in the case of being used together with an electrode containing a water reactive active material for reacting with water or a sulfide-based solid electrolyte layer, such a liquid hydrophobic phase transition substance may restrain the above-mentioned water reactive active material and sulfide-based solid electrolyte from contacting with water and restrain heat generation and deterioration in performance.

Further, the liquid hydrophobic phase transition substance is a liquid in which the hydrophilic salt of an alkali or an alkaline earth is dissolved and has ion conductivity, so that the properties of the battery may be restrained from deteriorating due to the increase in ionic conduction resistance even in the case of being mixed into a material composing the above-mentioned electrode and electrolyte or the like.

Accordingly, the liquid hydrophobic phase transition substance may improve the safety of the battery and restrain the deterioration in performance of the battery without deteriorating the properties of the battery.

In the present invention, diethylmethylisopropylammoniumbistrifluoromethanesulfonylimide or tetraethylammoniumbistrifluoromethanesulfonylimide is preferably used as the hydrophobic salt. The reason therefor is that the melting point is easily controlled by addition of the above-mentioned hydrophilic salt of an alkali or an alkaline earth.

Further, the hydrophilic salt of an alkali or an alkaline earth is preferably lithiumbistrifluoromethanesulfonylimide. The reason therefor is to allow the hydrophilic salt to be excellent in chemical stability.

The present invention provides a battery comprising at least one of: an electrode layer containing at least one of a water reactive active material for reacting with water and a sulfide-based solid electrolyte, and the liquid hydrophobic phase transition substance; and an electrolyte layer containing the liquid hydrophobic phase transition substance and the sulfide-based solid electrolyte.

The present invention comprises the above-mentioned liquid hydrophobic phase transition substance, so that the above-mentioned water reactive active material may be restrained from contacting with water, and heat generation and deterioration in performance may be restrained.

Further, the liquid hydrophobic phase transition substance has ion conductivity, so that the properties of the battery may be restrained from deteriorating by increase in ionic conduction resistance.

Accordingly, the liquid hydrophobic phase transition substance may improve the safety of the battery and restrain the deterioration in performance of the battery without deteriorating the properties of the battery.

The present invention allows the electrode layer having the liquid hydrophobic phase transition substance disposed on a surface thereof or having the liquid hydrophobic phase transition substance mixed with an electrode material composing the electrode layer. Further, the present invention allows the electrolyte layer having the liquid hydrophobic phase transition substance disposed on a surface thereof or having the liquid hydrophobic phase transition substance mixed with the sulfide-based solid electrolyte.

The reason therefor is that the use of such an electrode layer and an electrolyte layer may effectively restrain the above-mentioned water reactive active material or the like from contacting with water.

Advantageous Effects of Invention

The present invention produces the effect that it is capable of providing the liquid hydrophobic phase transition substance which may improve the safety of the battery and restrain the deterioration in performance of the battery without deteriorating the properties of the battery.

DESCRIPTION OF EMBODIMENTS

The present invention relates to a liquid hydrophobic phase transition substance and a battery comprising the same.

The liquid hydrophobic phase transition substance, the battery and the lithium air battery of the present invention are hereinafter described in detail.

A. Liquid Hydrophobic Phase Transition Substance

A liquid hydrophobic phase transition substance of the present invention is characterized by comprising a hydrophobic salt having a melting point of 80° C. or more and a hydrophilic salt of an alkali or an alkaline earth, and by being liquid.

According to the present invention, the liquid hydrophobic phase transition substance comprises the hydrophobic salt having a melting point of 80° C. or more and the hydrophilic salt of an alkali or an alkaline earth, so that the melting point of the above-mentioned hydrophobic salt may be depressed to room temperature, which is the operating temperature of the battery and is namely, 60° C. or less, by melting point depression, and the hydrophobic salt may be made into a liquid.

Here, the above-mentioned hydrophobic salt phase-separates from water by reason of having a hydrophobic property. On the other hand, the hydrophilic salt of an alkali or an alkaline earth dissolved in the above-mentioned hydrophobic salt is high in affinity with water. Thus, in the case where water contacts with the above-mentioned liquid hydrophobic phase transition substance, the hydrophilic salt of an alkali or an alkaline earth dissolved in an ion solid liquates into water and the melting point of the above-mentioned liquid hydrophobic phase transition substance rises; consequently, the above-mentioned hydrophobic salt which was in a state of a solution may phase-transit to a solid.

Thus, such a liquid hydrophobic phase transition substance is used as a protective material of a solid electrolyte layer comprising an electrode layer having a water reactive active material, which reacts with water to generate heat and deteriorate performance, or a sulfide-based solid electrolyte, so that the above-mentioned water reactive active material or the like may be restrained from contacting with water, and the improvement of the safety of the battery and the restraint of the deterioration in performance of the battery may be intended.

Further, the liquid hydrophobic phase transition substance is a liquid in which the hydrophilic salt of an alkali or an alkaline earth is dissolved and has ion conductivity, so that the properties of the battery may be restrained from deteriorating by increase in ionic conduction resistance even in the case of being mixed into a material composing the above-mentioned electrode and electrolyte or the like.

Through the above, the liquid hydrophobic phase transition substance may improve the safety of the battery and restrain the deterioration in performance of the battery without deteriorating the properties of the battery.

The liquid hydrophobic phase transition substance of the present invention comprises the ion solid and the hydrophilic salt of an alkali or an alkaline earth.

Each component of the liquid hydrophobic phase transition substance of the present invention is hereinafter described in detail.

1. Hydrophobic Salt

The hydrophobic salt used for the present invention has a melting point of 80° C. or more.

Such a hydrophobic salt is not particularly limited as long as the hydrophobic salt is a salt having a hydrophobic property, that is, a salt which phase-separates from water.

Above all, the hydrophobic salt which is made into a liquid is used in the present invention such that the melting point thereof may be depressed to room temperature, which is the operating temperature of the battery and is namely, 60° C. or less, by addition of the above-mentioned hydrophilic salt of an alkali or an alkaline earth. The reason therefor is that it can easily be used as a protective material of a member having a water reactive active material contained in the battery or the like.

Specific examples of the hydrophobic salt used for the present invention include salts composed of diethylmethylisopropylammoniumbistrifluoromethanesulfonylimide, tetraethylammoniumbistrifluoromethanesulfonylimide, tetramethylammoniumbistrifluoromethanesulfonylimide, N-ethyl, or N-methylpiperidinium, and any of the following formulae (1) to (6), and $C_lF_{2l+1}SO_3^-$ or $(C_mF_{2m+1}SO_2)(C_nF_{2n+1}SO_2)N^-$; above all, diethylmethylisopropylammoniumbistrifluoromethanesulfonylimide, tetraethylammoniumbistrifluoromethanesulfonylimide or tetramethylammoniumbistrifluoromethanesulfonylimide may be preferably used; and in particular, diethylmethylisopropylammoniumbistrifluoromethanesulfonylimide or tetraethylammoniumbistrifluoromethanesulfonylimide may be preferably used. The reason therefor is that the melting point is easily controlled by addition of the above-mentioned hydrophilic salt of an alkali or an alkaline earth.

[Chemical Formula 1]

(1)

(2)

(3)

(4)

(5)

(6)

With regard to the above-mentioned formulae (1) to (6), in $C_lF_{2l+1}SO_3^-$ and $(C_mF_{2m+1}SO_2)(C_nF_{2n+1}SO_2)N^-$, $R^1$ to $R^4$ are optional structures composed of $C_kH_{2k+1}$ or $C_mH_{2m+1}OC_nH_{2n}$, and "k" is an integer of 1 to 7, "l" is an integer of 1 to 5, "m" is an integer of 0 to 3 and "n" is an integer of 0 to 3.

2. Hydrophilic Salt of Alkali or Alkaline Earth

The hydrophilic salt of an alkali or an alkaline earth used for the present invention may depress the melting point of the above-mentioned hydrophobic salt by mixing with the above-mentioned hydrophobic salt.

Such a hydrophilic salt of an alkali or an alkaline earth is not particularly limited as long as the hydrophilic salt does not react with the above-mentioned hydrophobic salt, and examples thereof include a lithium salt, a sodium salt, a potassium salt and a silver salt.

A lithium salt used for an electrolyte of a general lithium battery may be used as the lithium salt among such hydrophilic salts of an alkali or an alkaline earth; more specific examples thereof include lithiumbistrifluoromethanesulfonylimide, $CF_3SO_3Li$, $LiCl$, $LiBr$, $LiClO_4$, $LiBF_4$, $LiPF_6$, $Li(FSO_2)_2N$, $Li(C_2F_5SO_2)_2N$ and $LiF$; above all, in the present invention, lithiumbistrifluoromethanesulfonylimide or $Li(C_2F_5SO_2)_2N$ is preferably used; and in particular, lithiumbistrifluoromethanesulfonylimide is preferably used. The reason therefor is to allow the lithium salt to be excellent in chemical stability and Li ion conductivity.

The content of the hydrophilic salt of an alkali or an alkaline earth used for the present invention is not particularly limited as long as the hydrophilic salt may depress the melting point of the above-mentioned hydrophobic salt to room temperature or below and perform desired ion conductivity, and the content is properly determined in accordance with factors such as kinds of the hydrophobic salt to be used and uses of the liquid hydrophobic phase transition substance of the present invention.

For example, in the case of using diethylmethylisopropylammoniumbistrifluoromethanesulfonylimide as the above-mentioned hydrophobic salt, the hydrophilic salt in the liquid hydrophobic phase transition substance of the present invention is preferably within a range of 0.5 mol/kg to 1.0 mol/kg, above all, preferably within a range of 0.6 mol/kg to 0.9 mol/kg, and particularly, preferably within a range of 0.7 mol/kg to 0.8 mol/kg. The reason therefor is that it may be usable for various batteries. Further, the reason therefor is that it is possible to bring a possibility of making the melting point high in the case the range of the hydrophilic salt is more than the above-mentioned range.

3. Liquid Hydrophobic Phase Transition Substance

The liquid hydrophobic phase transition substance of the present invention comprises the above-mentioned hydrophobic salt and hydrophilic salt of an alkali or an alkaline earth, and may comprise other additives as required.

The melting point of such a liquid hydrophobic phase transition substance may be room temperature or less, that is, 60° C. or less under atmospheric pressure, and varies with kinds and uses of a battery using the liquid hydrophobic phase transition substance of the present invention; in the present invention, the melting point is above all, preferably 30° C. or less, and particularly, preferably −30° C. or less. The reason therefor is that it may be usable for various batteries. Further, the reason therefor is that it may allow the battery excellent in the properties of the battery since excellent ion conductivity is performed even in a cold district or the like.

A method for producing the liquid hydrophobic phase transition substance of the present invention is not particularly limited as long as the method may uniformly mix the above-mentioned hydrophobic salt and hydrophilic salt of an alkali or an alkaline earth, and a publicly known mixing method may be used therefor.

The liquid hydrophobic phase transition substance of the present invention is used as an electrolyte material in the battery, and is, above all, appropriately used as a protective material for restraining a water reactive active material or a sulfide-based solid electrolyte contained in the battery from contacting with water.

B. Battery

Next, a battery of the present invention is described. The battery of the present invention comprises at least one of: an electrode layer containing at least one of a water reactive active material for reacting with water and a sulfide-based solid electrolyte, and the above-mentioned liquid hydrophobic phase transition substance; and an electrolyte layer containing the above-mentioned liquid hydrophobic phase transition substance and sulfide-based solid electrolyte, and may be divided into four embodiments: an embodiment comprising at least the electrode layer containing at least one of the above-mentioned water reactive active material and sulfide-based solid electrolyte and the above-mentioned liquid hydrophobic phase transition substance, wherein the above-mentioned electrode layer has the above-mentioned liquid hydrophobic phase transition substance disposed on a surface thereof (a first embodiment); an embodiment comprising at least the electrode layer containing at least one of the above-mentioned water reactive active material and sulfide-based solid electrolyte and the above-mentioned liquid hydrophobic phase transition substance, wherein the above-mentioned liquid hydrophobic phase transition substance is mixed with a material composing the electrode layer (a second embodiment); an embodiment comprising at least the electrolyte layer containing the above-mentioned liquid hydrophobic phase transition substance and sulfide-based solid electrolyte, wherein the above-mentioned electrolyte layer has the above-mentioned liquid hydrophobic phase transition substance disposed on a surface thereof (a third embodiment); and an embodiment comprising at least the electrolyte layer containing the above-mentioned liquid hydrophobic phase transition substance and sulfide-based solid electrolyte, wherein the above-mentioned liquid hydrophobic phase transition substance is mixed with the above-mentioned sulfide-based solid electrolyte (a fourth embodiment). The battery of the present invention is hereinafter described according to each embodiment.

1. First Embodiment

First, the first embodiment of the battery of the present invention is described. The battery of this embodiment is the above-mentioned battery comprising at least the electrode layer containing at least one of the above-mentioned water reactive active material and sulfide-based solid electrolyte, and the above-mentioned liquid hydrophobic phase transition substance, wherein the above-mentioned electrode layer has the above-mentioned liquid hydrophobic phase transition substance disposed on a surface thereof.

Figure 1:
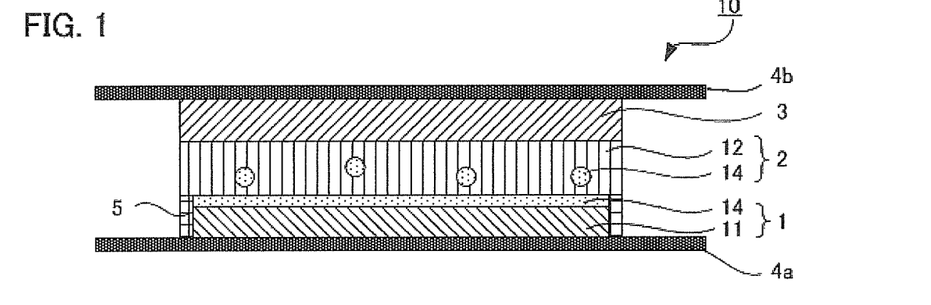
FIG. 1 is a schematic view showing an example of a battery of the present invention.

Such a battery of this embodiment is described while referring to drawings. FIG. 1 is a schematic view showing an example of the battery of this embodiment. As exemplified in FIG. 1, a battery 10 of this embodiment comprises: a cathode layer 3; an anode layer (a water-resistant anode layer) 1 containing an anode layer material 11 made of metallic lithium as the water reactive active material and the above-mentioned liquid hydrophobic phase transition substance 14 disposed so as to cover a surface; an electrolyte (a water-resistant electrolyte layer) 2, which is disposed between the cathode layer 3 and the anode layer 1 and contain a sulfide-based solid electrolyte 12 and the liquid hydrophobic phase transition substance 14 mixed with the sulfide-based solid electrolyte 12; and current collectors (4a and 4b) connected to the anode layer 1 and the cathode layer 3. Further, the battery 10 comprises a sealing member 5 for sealing an outflow of the liquid hydrophobic phase transition substance 14, which is disposed so as to cover the liquid hydrophobic phase transition substance 14.

In this example, the battery is a solid state battery and the liquid hydrophobic phase transition substance protects the water reactive active material from moisture which permeates through the d sealing member.

According to this embodiment, the electrode layer has the above-mentioned liquid hydrophobic phase transition substance disposed on a surface thereof, so that water which invades from the outside of the battery may be effectively restrained from contacting with the above-mentioned water reactive active material even in the case of containing at least one of the above-mentioned water reactive active material and sulfide-based solid electrolyte. Thus, the deterioration in performance caused by heat generation due to the contact of the water reactive active material with water and hydrogen sulfide generation due to the contact of the sulfide-based solid electrolyte with water may be restrained.

Further, the above-mentioned liquid hydrophobic phase transition substance is a liquid in which the hydrophilic salt of an alkali or an alkaline earth is dissolved and has ion conductivity, so that the properties of the battery may be restrained from deteriorating by increase of ionic conduction resistance even in the case where the liquid hydrophobic phase transition substance is mixed into the electrode material, the electrolyte or the like.

Through the above, the liquid hydrophobic phase transition substance may improve the safety of the battery and restrain the deterioration in performance of the battery without deteriorating the properties of the battery.

The battery of this embodiment comprises at least the above-mentioned electrode layer. Each constitution of such a battery of this embodiment is hereinafter described in detail.

(1) Electrode Layer

The electrode layer used for this embodiment (hereinafter referred to as a water-resistant electrode layer in this section) has the above-mentioned liquid hydrophobic phase transition substance disposed on a surface thereof, and may be divided into two aspects: an aspect containing the above-mentioned water reactive active material and the above-mentioned liquid hydrophobic phase transition substance (A aspect), and an aspect containing the above-mentioned sulfide-based solid electrolyte, the above-mentioned liquid hydrophobic phase transition substance and an electrode active material (B aspect).

The electrode layer used for this embodiment is hereinafter described in each aspect.

(a) A Aspect

The water-resistant electrode layer used for this aspect contains the above-mentioned water reactive active material and the above-mentioned liquid hydrophobic phase transition substance. Further, ordinarily, this aspect contains an electrode material composing the above-mentioned water-resistant electrode layer.

a. Liquid Hydrophobic Phase Transition Substance

The liquid hydrophobic phase transition substance used for this aspect is the above-mentioned liquid hydrophobic phase transition substance and disposed on a surface of the above-mentioned water-resistant electrode layer.

A material composing such a liquid hydrophobic phase transition substance is the same as the contents described in the above-mentioned section of 'A. Liquid hydrophobic phase transition substance'; therefore, the description herein is omitted.

The disposition location of the liquid hydrophobic phase transition substance used for this aspect is not particularly limited as long as a function as the electrode of the above-mentioned water-resistant electrode layer may be performed and the water reactive active material contained in the water-resistant electrode layer may be stably restrained from contacting with water.

Figure 2:
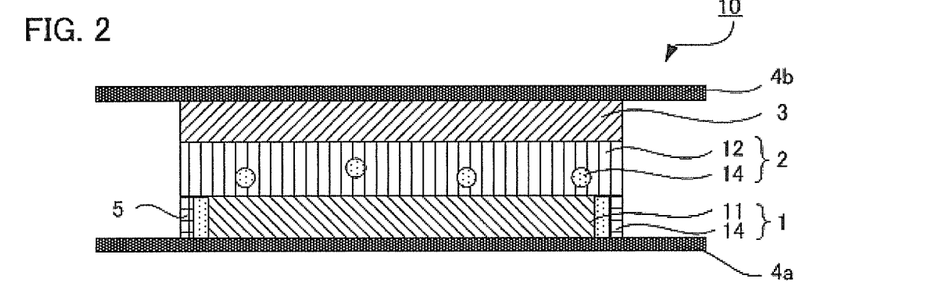
FIG. 2 is a schematic view showing another example of a battery of the present invention.

Specifically, the liquid hydrophobic phase transition substance may be disposed between the anode layer 1 and the electrolyte (solid electrolyte layer) 2 in the surface of the anode layer (water-resistant anode layer) as shown in FIG. 1 already described, and may also be disposed on the side face of the anode layer (water-resistant anode layer) 1 as shown in FIG. 2.

FIG. 2 is an example of a solid state battery in which the electrolyte is the solid electrolyte layer. In addition, in FIG. 1, the liquid hydrophobic phase transition substance is disposed between the water-resistant anode layer and the cathode layer, and also functions as the electrolyte of the battery of this aspect.

Further, the reference numerals in FIG. 2 are the same as those in FIG. 1.

In this aspect, above all, the disposition location of the liquid hydrophobic phase transition substance is preferably at least the side face of the water-resistant electrode layer, and particularly preferably the side face of the water-resistant electrode layer and the surface on the electrolyte side. The reason therefor is that the water reactive active material may be effectively restrained from contacting with water.

Further, in the case where the electrolyte used for the battery of this aspect is a liquid electrolyte, the liquid hydrophobic phase transition substance is preferably disposed so as not to contact with the liquid electrolyte. The reason therefor is that, since the liquid hydrophobic phase transition substance is a liquid, it may bring a possibility of leaking out of the water-resistant electrode layer in the case of contacting with the liquid electrolyte.

The film thickness of the liquid hydrophobic phase transition substance used for this aspect is not particularly limited as long as the water reactive active material may be stably restrained from contacting with water, and it is preferably within a range of 0.1 µm to 10 mm, and above all preferably within a range of 0.1 µm to 3 mm. The reason therefor is that the film thickness within the above-mentioned range allows the water reactive active material to be effectively restrained from contacting with water. Further, the reason therefor is to allow the liquid hydrophobic phase transition substance to be excellent in ion conductivity even in the case where the liquid hydrophobic phase transition substance is disposed between a pair of electrodes, that is, the liquid hydrophobic phase transition substance is used as the electrolyte in the battery of this aspect.

b. Water Reactive Active Material

The water reactive active material used for this aspect is an electrode active material which reacts to generate heat and deteriorate in contacting with water.

Such a water reactive active material is not particularly limited as long as the water reactive active material is an electrode active material used for the electrode layer in the battery, and examples thereof include an electrode active material used for the cathode layer and the anode layer of a nonaqueous battery having a nonaqueous liquid electrolyte as the electrolyte, a solid state battery having a solid electrolyte as the electrolyte, and an air battery using oxygen as the electrode active material.

Specific examples of such a water reactive active material include metallic lithium, metallic sodium, metallic potassium and sulfur.

The content of the water reactive active material used for this aspect is not particularly limited as long as the water reactive active material performs desired electrical properties, and the content varies in accordance with factors such as kinds and uses of the battery of this aspect, and is preferable, in the water-resistant electrode layer, within a range of 60% by mass to 97% by mass, above all within a range of 75% by mass to 97% by mass, and particularly within a range of 90% by mass to 97% by mass.

c. Electrode Material

The above-mentioned water reactive active material and the above-mentioned liquid hydrophobic phase transition substance as well as another electrode material composing the above-mentioned water-resistant electrode layer are used for the electrode layer of this aspect.

Such another electrode material is properly selected in accordance with factors such as use of the water-resistant electrode layer in this aspect, and an electrode material used for a general battery may be used. Specifically, in the case of being used for the cathode layer and the cathode layer in the above-mentioned nonaqueous battery and solid state battery, or the anode layer included in the air battery, the above-mentioned water-resistant electrode layer may contain an ion conductivity improving material, a conductive material and a binder.

Further, the electrode active material ordinarily used may be used by mixture, if necessary, in addition to the above-mentioned water reactive active material.

The ion conductivity improving material in this aspect is not particularly limited as long as the ion conductivity improving material may improve ion conductivity, and examples thereof include the above-mentioned sulfide-based solid electrolyte.

The above-mentioned conductive material is not particularly limited as long as the conductive material may improve conductivity, and examples thereof include carbon black such as acetylene black and Ketjen Black. Further, the content of the conductive material in the above-mentioned water-resistant electrode layer varies with kinds of the conductive material and is ordinarily within a range of 1% by mass to 10% by mass.

The above-mentioned binder is not particularly limited as long as the binder may stably fix the electrode active material containing the above-mentioned water reactive active material or the like, and examples thereof include polyvinylidene fluoride (PVDF), polytetrafluorethylene (PTFE), butadiene rubber and silicone rubber. Further, the content of the binder in the water-resistant electrode layer may be an amount as much as that capable of fixing the above-mentioned electrode active material, and be ordinarily within a range of 1% by mass to 10% by mass.

d. Electrode Layer

The electrode layer used for the battery of this aspect, namely, the water-resistant electrode layer contains the above-mentioned water reactive active material and the above-mentioned liquid hydrophobic phase transition substance.

The water-resistant electrode layer used for this aspect is used as the water-resistant electrode layer which varies with kinds of the above-mentioned water reactive active material.

Specifically, the above-mentioned water-resistant electrode layer is used as the water-resistant anode layer in a battery such as the nonaqueous battery, the solid state battery, or the air battery, or the water-resistant cathode layer in the nonaqueous battery and the solid state battery.

The film thickness of the water-resistant electrode layer used for this aspect is not particularly limited as long as the water-resistant electrode layer may have desired electrical properties, and it is preferably within a range of 10 μm to 1 mm, and above all within a range of 10 μm to 100 μm.

A method for producing the water-resistant electrode layer used for this aspect is not particularly limited as long as the method is a method which may form the water-resistant electrode layer having the above-mentioned liquid hydrophobic phase transition substance disposed on a surface thereof, with favorable accuracy. Examples of the method include a method for compression-molding the electrode material containing the above-mentioned water reactive active material in powdery form to thereafter seal and dispose the above-mentioned liquid hydrophobic phase transition substance on the periphery thereof by a sealing member or the like, a method for applying the above-mentioned liquid hydrophobic phase transition substance on a surface of the electrode layer, and a method for kneading and then compression-molding the above-mentioned water reactive active material in powdery form and the above-mentioned liquid hydrophobic phase transition substance.

(b) B Aspect

The water-resistant electrode layer used for this aspect contains the above-mentioned sulfide-based solid electrolyte, the above-mentioned liquid hydrophobic phase transition substance and an electrode active material. Further, ordinarily, this aspect contains another electrode material composing the above-mentioned water-resistant electrode layer.

The above-mentioned liquid hydrophobic phase transition substance, and a producing method, kinds and film thickness of the above-mentioned water-resistant electrode layer are the same as those described in the above-mentioned section of '(a) A aspect'; therefore, the description herein is omitted.

a. Sulfide-Based Solid Electrolyte

The sulfide-based solid electrolyte used for this aspect is not particularly limited as long as the sulfide-based solid electrolyte contains sulfur and generates hydrogen sulfide by contacting with water, and a sulfide-based solid electrolyte used for a general solid state battery may be used.

Examples of the sulfide-based solid electrolyte include a sulfide-based solid electrolyte having Li, S and a third component. Examples of the third component include at least one kind selected from the group consisting of P, Ge, B, Si, I, Al, Ga and As.

Specific examples of such a sulfide-based solid electrolyte include $Li_2S$—$P_2S_5$, $70Li_2S$-$30P_2S_5$, $80Li_2S$-$20P_2S_5$, $Li_2S$—$SiS_2$ and $LiGe_{0.25}P_{0.75}S_4$; above all, $Li_2S$—$P_2S_5$ is preferable. The reason therefor is that ionic conductance is high.

Examples of a method for producing the sulfide-based solid electrolyte include a method for vitrifying a raw material containing Li, S and the third component by planetary ball mill or a method for vitrifying the raw material by melt extraction. Heat treatment may be performed for the purpose of performance improvement in producing the above-mentioned sulfide-based solid electrolyte.

The content of the sulfide-based solid electrolyte used for this aspect is not particularly limited as long as the sulfide-based solid electrolyte imparts desired ion conductivity to the above-mentioned water-resistant electrode layer, and it may be the same as a general all solid state battery.

Specifically, the content is preferably within a range of 60% by mass to 99% by mass, above all within a range of 70% by mass to 99% by mass, and particularly within a range of 80% by mass to 99% by mass. The reason therefor is that the content of the sulfide-based solid electrolyte within the above-mentioned range allows the water-resistant electrode layer to be particularly excellent in ion conductivity.

b. Electrode Active Material

The electrode active material used for this aspect is contained together with the above-mentioned sulfide-based solid electrolyte, the above-mentioned liquid hydrophobic phase transition substance and another electrode material.

Such an electrode active material may be the water reactive active material having water reactivity or a water nonreactive active material having no water reactivity.

The water nonreactive active material used for the present invention is not particularly limited as long as the water nonreactive active material may perform desired electrical properties, and, for example, an electrode active material used for a general lithium battery may be used in the case of the lithium battery.

Specific examples thereof include water nonreactive anode active materials, for example, metal active materials such as In, Al, Si and Sn, and carbon active materials such as graphite, mesocarbon microbeads (MCMB), high orientation property graphite (HOPG), hard carbon and soft carbon; and water nonreactive cathode active materials such as $LiCoO_2$, $LiMn_2O_4$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$.

The water reactive active material is the same as those described in the above-mentioned section of '(a) A aspect'; therefore, the description herein is omitted.

c. Electrode Material

The above-mentioned sulfide-based solid electrolyte, the above-mentioned liquid hydrophobic phase transition substance and the electrode active material as well as another electrode material composing the above-mentioned water-resistant electrode layer are used for the electrode layer of this aspect.

Such another electrode material is properly selected in accordance with factors such as the use of the water-resistant electrode layer in this aspect, and an electrode material used for a general battery may be used. Specifically, in the case of being used for the cathode layer and the anode layer in the above-mentioned nonaqueous battery and solid state battery, the anode layer included in the above-mentioned air battery or the like, the above-mentioned water-resistant electrode layer may contain an ion conductivity improving material, a conductive material and a binder.

Further, the solid electrolyte ordinarily used may be used by mixture, if necessary, in addition to the above-mentioned sulfide-based solid electrolyte.

The above-mentioned ion conductivity improving material, conductive material and binder are the same as those described in the above-mentioned section of '(a) A aspect'; therefore, the description herein is omitted.

(2) Battery

The battery of this aspect contains at least the above-mentioned water-resistant electrode layer.

Such a battery is not particularly limited as long as the battery contains the above-mentioned water-resistant electrode layer, but it contains at least a pair of electrode layers and an electrolyte.

Further, kinds of the battery of this aspect may be a primary battery or a secondary battery, and preferably a secondary battery among them. The reason therefor is that it is useful as a car-mounted battery, for example. Further, the battery of this aspect may be used for the above-mentioned nonaqueous battery, solid state battery and air battery.

(a) Pair of Electrode Layers

A pair of electrode layers used for this aspect contains at least the above-mentioned water-resistant electrode layer. In this aspect, the above-mentioned water-resistant electrode layer may be one of the above-mentioned pair of electrode layers or both of them.

In this aspect, in the case where the above-mentioned water-resistant electrode layer is one of the above-mentioned pair of electrode layers, the other electrode layer is properly selected in accordance with kinds of the battery of this aspect, and an electrode layer used for a general battery may be used. Specifically, an electrode layer containing the electrode active material and another electrode material described in the above-mentioned '(b) B aspect' of '(1) Electrode layer' may be used.

(b) Electrolyte

The electrolyte used for this aspect is properly selected in accordance with kinds of the battery of this aspect, and an electrolyte used for a general battery may be used.

Specifically, a nonaqueous liquid electrolyte may be used in the case where the battery of this aspect is the above-mentioned nonaqueous battery or air battery, and a solid electrolyte layer containing a solid electrolyte may be used in the case where the battery of this aspect is the above-mentioned solid state battery.

Further, the above-mentioned hydrophobic phase transition substance may be used as the electrolyte. The reason therefor is that the above-mentioned liquid hydrophobic phase transition substance may be used as the electrolyte since the substance has ion conductivity.

The nonaqueous liquid electrolyte used for this aspect is not particularly limited as long as the nonaqueous liquid electrolyte has desired ion conductivity, and examples thereof include an organic solvent liquid electrolyte containing an organic solvent and a metal salt, an ionic liquid electrolyte containing an ionic liquid and a metal salt, a polymer electrolyte, and a gel electrolyte.

Examples of the organic solvent used for the organic solvent liquid electrolyte in this aspect include ethylene carbonate (EC), propylene carbonate (PC), dimethyl carbonate (DMC), diethyl carbonate (DEC), ethyl methyl carbonate (EMC), butylene carbonate, γ-butyrolactone, sulfolane, acetonitrile, 1,2-dimethoxymethane, 1,3-dimethoxypropane, diethyl ether, tetrahydrofuran, 2-methyltetrahydrofuran and mixtures thereof. Further, the above-mentioned organic solvent is preferably a solvent high in oxygen solubility. The reason therefor is that dissolved oxygen may be efficiently used for reaction.

The metal salt in this aspect is properly selected in accordance with kinds of a metal ion which conducts, and examples thereof include a lithium salt, a sodium salt and a potassium salt; for example, in the case of being used for a lithium battery, the organic solvent liquid electrolyte contains a lithium salt ordinarily.

Examples of such a lithium salt include inorganic lithium salts such as $LiPF_6$, $LiBF_4$, $LiClO_4$ and $LiAsF_6$; and organic lithium salts such as $LiCF_3SO_3$, $LiN(CF_3SO_2)_2$, $LiN(C_2F_5SO_2)_2$ and $LiC(CF_3SO_2)_3$.

The concentration of the metal salt in the above-mentioned organic solvent liquid electrolyte is within a range of 0.1 mol/L to 3 mol/L, for example.

Examples of the ionic liquid in this aspect include 1-ethyl,3-methylimidazoliumbistrifluoromethanesulfonylimide, 1-propyl,1-methylpiperidiniumbistrifluoromethanesulfonylimide, 1-butyl,1-methylpyrrolidiniumbistrifluoromethanesulfonylimide, trimethylbutylammoniumbistrifluoromethanesulfonylimide, and 1-butyl,1-methylpyrrolidiniumtripentafluoroethyltrifluorophosphate.

The polymer electrolyte in this aspect contains a metal salt and a polymer. A metal salt the same as the metal salt used for the above-mentioned organic solvent liquid electrolyte may be used. The polymer is not particularly limited as long as the polymer forms a complex with the above-mentioned metal salt, and examples thereof include polyethylene oxide.

The gel electrolyte contains a metal salt, a polymer and a nonaqueous solvent. The metal salt and the nonaqueous solvent the same as the metal salt and the nonaqueous solvent used for the above-mentioned organic solvent liquid electrolyte may be used. Further, the polymer is not particularly limited as long as the polymer may be gelated, and examples thereof include polyethylene oxide, polypropylene oxide, polyacrylonitrile, polyvinylidene fluoride (PVDF), polyurethane, polyacrylate and cellulose.

The solid electrolyte layer used for this aspect is not particularly limited as long as the solid electrolyte layer has ion conductivity, and a solid electrolyte used for a general solid state battery may be used. Examples thereof include the above-mentioned sulfide-based solid electrolyte, a phosphoric acid-based solid electrolyte, a perovskite-based solid electrolyte and a garnet-based solid electrolyte. In this aspect, the above-mentioned sulfide-based solid electrolyte is preferable above all. The reason therefor is that ion conductivity is high.

The electrolyte in the case where the liquid hydrophobic phase transition substance in this aspect is contained as the electrolyte may be such that at least part of the above-mentioned liquid hydrophobic phase transition substance is disposed between the above-mentioned pair of electrode layers; specifically, as shown in FIG. 1 already described, the above-mentioned electrolyte may be made of the above-mentioned liquid hydrophobic phase transition substance and another electrolyte. Further, as exemplified in FIG. 3, the above-mentioned electrolyte may be made of only the above-mentioned liquid hydrophobic phase transition substance.

Here, the reason therefor is that the case where the above-mentioned electrolyte is made of only the above-mentioned liquid hydrophobic phase transition substance may allow the above-mentioned electrolyte to contain no other electrolytes to provide the battery having a simple structure.

Further, the case where the above-mentioned electrolyte is made of the above-mentioned liquid hydrophobic phase transition substance and another electrolyte has the advantage that an electrolyte which is more excellent in ion conductivity than the above-mentioned liquid hydrophobic phase transition substance may be used as the above-mentioned another electrolyte. Thus, the reason therefor is that the thickness of the above-mentioned electrolyte is easily adjusted and an interval between the electrodes, which hold the above-mentioned electrolyte therebetween, may be determined so that a short circuit may be stably restrained.

Another electrolyte in the case where the electrolyte in this aspect is made of the above-mentioned liquid hydrophobic phase transition substance and another electrolyte is not particularly limited as long as the surface is covered with the above-mentioned liquid hydrophobic phase transition substance.

Figure 3:
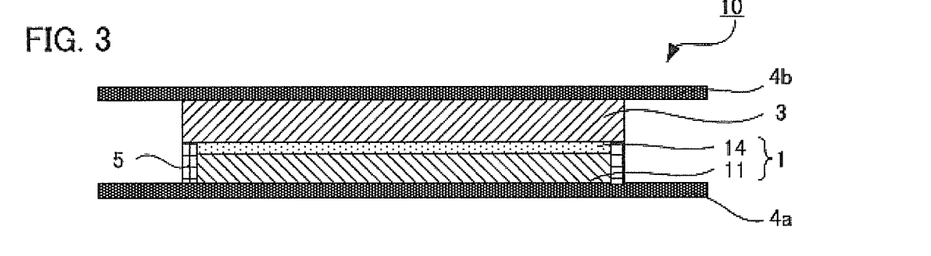
FIG. 3 is a schematic view showing still another example of a battery of the present invention.

FIG. 3 is a schematic view showing another example of the battery of this aspect and the reference numerals in the Drawings are the same as those in FIG. 1.

(c) Others

The battery of this aspect has at least a pair of electrode layers containing the above-mentioned water-resistant electrode layer and the electrolyte, and ordinarily has a current collector connected to the above-mentioned pair of electrode layers, a separator for preventing the contact between the electrodes, and a battery case. Such a current collector, a separator, a battery case, or the like may adopt ones used for a general battery; therefore, the description herein is omitted.

2. Second Embodiment

Next, the second embodiment of the battery of the present invention is described. The battery of this embodiment is the above-mentioned battery comprising at least the electrode layer containing at least one of the above-mentioned water reactive active material and sulfide-based solid electrolyte and the above-mentioned liquid hydrophobic phase transition substance, wherein the above-mentioned liquid hydrophobic phase transition substance is mixed with an electrode material composing the electrode layer.

Figure 4:
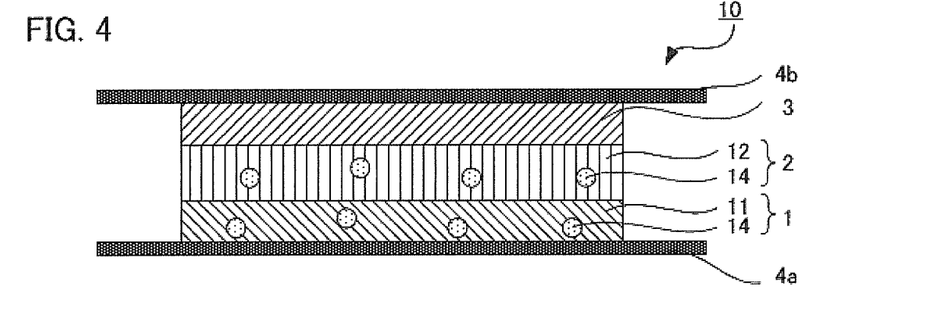
FIG. 4 is a schematic view showing yet another example of a battery of the present invention.

Such a battery of this embodiment is described while referring to drawings. FIG. 4 is a schematic view showing an example of the battery of this embodiment. As exemplified in FIG. 4, a battery 10 of this embodiment comprises: a cathode layer 3; an anode layer (a water-resistant anode layer) 1 containing an anode layer material 11 containing the water reactive active material and the above-mentioned liquid hydrophobic phase transition substance 12 mixed with the anode layer material 11; an electrolyte (a water-resistant electrolyte layer) 2, which is disposed between the above-mentioned cathode layer 3 and anode layer 1, containing a sulfide-based solid electrolyte 12 and the liquid hydrophobic phase transition substance 14 mixed with the above-mentioned sulfide-based solid electrolyte; and current collectors (4a and 4b) connected to the anode layer 1 and the cathode layer 3.

In this example, the above-mentioned battery is a solid state battery. The reference numerals in the drawings are the same as those in FIG. 1.

According to this aspect, the liquid hydrophobic phase transition substance may improve the safety of the battery and restrain the deterioration in performance of the battery without deteriorating the properties of the battery.

Further, the electrode layer has the liquid hydrophobic phase transition substance mixed with the electrode material, so that the electrode layer may be easily produced. Further, even in the case where water is mixed into the electrode layer during production, the water reactive active material in the electrode layer may be effectively restrained from contacting with water.

The battery of this embodiment has at least the above-mentioned electrode layer. Each constitution of such a battery of this embodiment is hereinafter described in detail.

(1) Electrode Layer

The electrode layer used for this embodiment (hereinafter referred to as a water-resistant electrode layer) has the above-mentioned liquid hydrophobic phase transition substance mixed with an electrode material composing the water-resistant electrode layer, and may be divided into two aspects: an aspect containing the above-mentioned water reactive active material and the above-mentioned liquid hydrophobic phase transition substance (C aspect), and an aspect containing the above-mentioned sulfide-based solid electrolyte, the above-mentioned liquid hydrophobic phase transition substance, and an electrode active material (D aspect).

The electrode layer used for this embodiment is hereinafter described in each aspect.

(a) C Aspect

The water-resistant electrode layer used for this aspect contains the above-mentioned water reactive active material and the above-mentioned liquid hydrophobic phase transition substance. Further, ordinarily, this aspect contains another electrode material composing the above-mentioned water-resistant electrode layer.

The above-mentioned water reactive active material and another electrode material are the same as those described in the above-mentioned section of '(a) A aspect' of '(1) Electrode layer' in '1. First Embodiment'; therefore, the description herein is omitted.

a. Liquid Hydrophobic Phase Transition Substance

The liquid hydrophobic phase transition substance used for this aspect is mixed with the above-mentioned electrode material, that is, that contained inside the above-mentioned water-resistant electrode layer.

A material or the like composing the liquid hydrophobic phase transition substance used for this aspect is the same as those described in the above-mentioned section of 'A. Liquid hydrophobic phase transition substance'; therefore, the description herein is omitted.

The content of the liquid hydrophobic phase transition substance in this aspect is not particularly limited as long as the above-mentioned water reactive active material may be stably restrained from contacting with water, and it is preferably within a range of 1% by mass to 50% by mass, above all preferably within a range of 2% by mass to 20% by mass, and particularly preferably within a range of 3% by mass to 10% by mass in the water-resistant electrode layer. The reason therefor is that the water reactive active material may be effectively restrained from contacting with water.

b. Electrode Layer

The electrode layer in this aspect, namely, the water-resistant electrode layer contains the above-mentioned water reactive active material and the above-mentioned liquid hydrophobic phase transition substance, and the liquid hydrophobic phase transition substance is mixed with an electrode material composing the water-resistant electrode layer.

A method for producing such a water-resistant electrode layer is not particularly limited as long as the liquid hydrophobic phase transition substance is mixed with the electrode material so that the water reactive active material may be stably restrained from contacting with water, and a method for mixing and compression-molding the liquid hydrophobic phase transition substance and the electrode material containing the water reactive active material using a known mixing method may be employed.

Kind and film thickness of the water-resistant electrode layer in this aspect are the same as those described in the above-mentioned section of '1. First Embodiment'; therefore, the description herein is omitted.

(b) D Aspect

The water-resistant electrode layer used for this aspect contains the above-mentioned sulfide-based solid electrolyte, the above-mentioned liquid hydrophobic phase transition substance and an electrode active material. Further, ordinarily, this aspect contains another electrode material composing the above-mentioned water-resistant electrode layer.

A producing method, kinds and film thickness of the above-mentioned liquid hydrophobic phase transition substance and the water-resistant electrode layer are the same as those described in the above-mentioned section of '(a) C aspect'; therefore, the description herein is omitted.

Further, the above-mentioned sulfide-based solid electrolyte, the electrode active material and another electrode material are the same as those described in the above-mentioned section of '(b) B aspect' of '(1) Electrode layer' in '1. First Embodiment'; therefore, the description herein is omitted.

(2) Battery

The battery of this aspect has at least the above-mentioned electrode layer, namely, the water-resistant electrode layer.

The battery of this aspect is not particularly limited as long as the battery has at least the above-mentioned water-resistant electrode layer, and it ordinarily contains at least a pair of electrode layers and an electrolyte. Further, the battery ordinarily contains the above-mentioned current collector, separator and battery case.

Kinds of such a battery, a pair of electrode layers, an electrolyte, a current collector, a separator and a battery case are the same as those described in the above-mentioned section of '1. First Embodiment'; therefore, the description herein is omitted.

3. Third Embodiment

Next, the third embodiment of the battery of the present invention is described. The battery of this embodiment is the above-mentioned battery comprising at least the electrolyte layer containing the above-mentioned liquid hydrophobic phase transition substance and sulfide-based solid electrolyte, wherein the above-mentioned electrolyte layer has the above-mentioned liquid hydrophobic phase transition substance disposed on a surface thereof.

Figure 5:
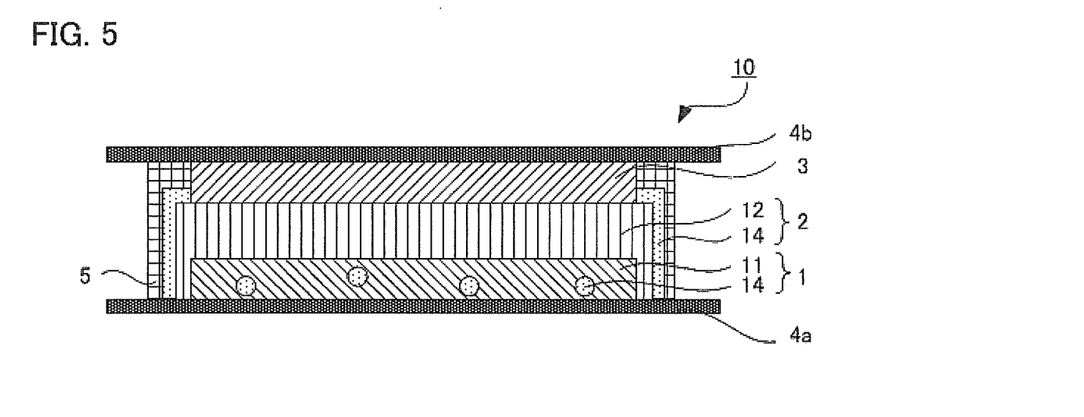
FIG. 5 is a schematic view showing further another example of a battery of the present invention.

Such a battery of this embodiment is described while referring to drawing. FIG. 5 is a schematic view showing an example of the battery of this embodiment. As exemplified in FIG. 5, the battery of this aspect has an electrolyte (a water-resistant electrolyte layer) 2, which is disposed between the above-mentioned cathode layer 3 and anode layer 1, containing a sulfide-based solid electrolyte 12 and a liquid hydrophobic phase transition substance 14 disposed so as to cover a surface thereof.

In this example, the above-mentioned battery is a solid state battery and the reference numerals in FIG. 5 are the same as those in FIG. 1.

According to this embodiment, the safety of the battery may be improved and the deterioration in performance of the battery may be restrained, without deteriorating the properties of the battery.

Further, the above-mentioned electrolyte layer has the above-mentioned liquid hydrophobic phase transition substance disposed on a surface thereof, so that water which invades from the outside of the battery may be effectively restrained from contacting with the sulfide-based solid electrolyte contained in the electrolyte layer.

The battery of this embodiment has at least the above-mentioned electrolyte layer. Each constitution of such a battery of this embodiment is hereinafter described in detail.

(1) Electrolyte Layer

The electrolyte layer used for this embodiment (hereinafter referred to as a water-resistant electrolyte layer) contains the above-mentioned liquid hydrophobic phase transition substance and sulfide-based solid electrolyte, and has the above-mentioned liquid hydrophobic phase transition substance disposed on a surface thereof. Such a water-resistant electrolyte layer is hereinafter described.

The above-mentioned sulfide-based solid electrolyte is the same as that described in the above-mentioned section of '1. First Embodiment'; therefore, the description herein is omitted.

(a) Liquid Hydrophobic Phase Transition Substance

The liquid hydrophobic phase transition substance used for this embodiment is the above-mentioned liquid hydrophobic phase transition substance and disposed on a surface of the above-mentioned water-resistant electrolyte layer.

A material composing such a liquid hydrophobic phase transition substance is the same as that described in the above-mentioned section of 'A. Liquid hydrophobic phase transition substance'; therefore, the description herein is omitted.

The disposition location and film thickness of the liquid hydrophobic phase transition substance used for this embodiment are not particularly limited as long as the sulfide-based solid electrolyte contained in the above-mentioned water-resistant electrolyte layer may be stably restrained from contacting with water, and it may be the same as that described in the above-mentioned section of '1. First Embodiment'.

(b) Electrolyte Layer

The electrolyte layer used for this embodiment, namely, the water-resistant electrolyte layer, contains the above-mentioned liquid hydrophobic phase transition substance and sulfide-based solid electrolyte.

It is preferable that the film thickness of such a water-resistant electrolyte layer have desired energy density without short-circuiting, and it be within a range of 0.1 μm to 1000 μm, and above all preferably within a range of 0.1 μm to 300 μm.

Examples of a method for forming the water-resistant electrolyte layer used for this embodiment include a method for palletizing the above-mentioned sulfide-based solid electrolyte by uniaxial compression molding to thereafter apply the above-mentioned liquid hydrophobic phase transition substance on a surface thereof.

(2) Battery

The battery of this embodiment has the above-mentioned water-resistant electrolyte layer.

The battery of this embodiment is not particularly limited as long as the battery has at least the above-mentioned water-resistant electrolyte layer, and it ordinarily contains at least a pair of electrode layers and an electrolyte.

(a) Pair of Electrode Layers

A pair of electrode layers used for this embodiment is not particularly limited as long as the electrode layers hold the above-mentioned water-resistant electrolyte layer therebetween and perform desired electrical properties.

As such a pair of electrode layers, an electrode layer used for a general battery may be used, and, for example, may be the same as that described in the above-mentioned section of '1. First Embodiment'.

(b) Electrolyte

The electrolyte used for this embodiment is not particularly limited as long as the electrolyte is held between the above-mentioned pair of electrode layers and contains the above-mentioned water-resistant electrolyte layer.

Figure 6:
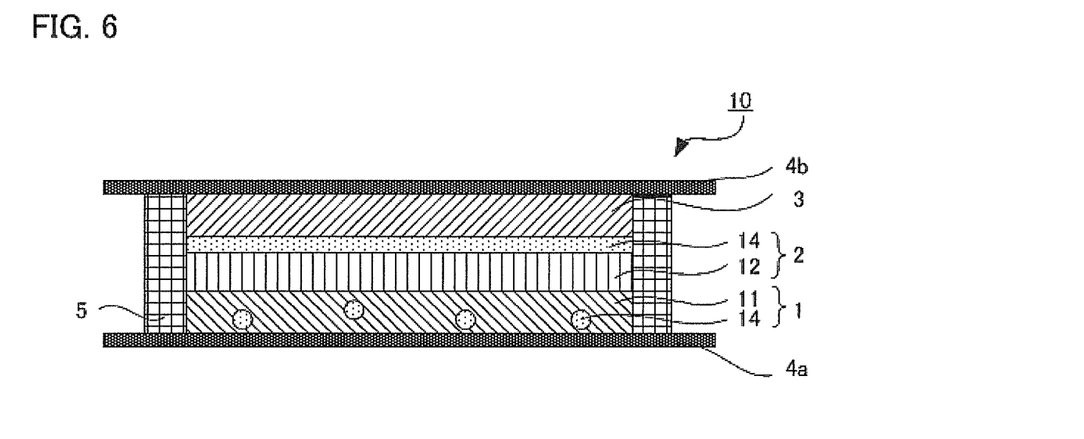
FIG. 6 is a schematic view showing still yet another example of a battery of the present invention.

Specifically, the above-mentioned electrolyte may contain a layer made of the above-mentioned liquid hydrophobic phase transition substance between the above-mentioned pair of electrode layers, that is, that connecting the pair of electrode layers through the liquid hydrophobic phase transition substance, as exemplified in FIG. 6, or it may contain no layers made of the above-mentioned liquid hydrophobic phase transition substance between the above-mentioned pair of electrode layers, that is, that connecting the pair of electrode layers through only the sulfide-based solid electrolyte, as shown in FIG. 5 already described.

(c) Others

The battery of this embodiment has at least the above-mentioned pair of electrode layers and the electrolyte containing the above-mentioned water-resistant electrolyte layer, and ordinarily, it further contains the above-mentioned current collector, separator and battery case.

Kinds of such a battery, a current collector, a separator and a battery case are the same as those described in the above-mentioned section of '1. First Embodiment'; therefore, the description herein is omitted.

4. Fourth Embodiment

Next, the fourth embodiment of the battery of the present invention is described. The battery of this embodiment is the above-mentioned battery comprising at least the electrolyte layer containing the above-mentioned liquid hydrophobic phase transition substance and sulfide-based solid electrolyte, wherein the above-mentioned electrolyte layer has the above-mentioned liquid hydrophobic phase transition substance mixed with the above-mentioned sulfide-based solid electrolyte.

Examples of such a battery of this embodiment include a battery shown in FIG. 1 already described.

According to this embodiment, the liquid hydrophobic phase transition substance may improve the safety of the battery and restrain the deterioration in performance of the battery without deteriorating the properties of the battery.

Further, the above-mentioned electrolyte layer has the above-mentioned liquid hydrophobic phase transition substance mixed with the above-mentioned sulfide-based solid electrolyte, so that the above-mentioned electrolyte layer may be easily produced. Further, even in the case where water is mixed into the above-mentioned electrolyte layer during production, the sulfide-based solid electrolyte in the above-mentioned electrolyte layer may be effectively restrained from contacting with water.

The battery of this aspect embodiment has at least the above-mentioned electrolyte layer. Each constitution of such a battery of this embodiment is hereinafter described in detail.

(1) Electrolyte Layer

The electrolyte layer used for this embodiment (hereinafter referred to as a water-resistant electrolyte layer in this section) contains the above-mentioned liquid hydrophobic phase transition substance and sulfide-based solid electrolyte, and is such that the above-mentioned liquid hydrophobic phase transition substance is mixed with the above-mentioned sulfide-based solid electrolyte. Such an electrolyte layer is hereinafter described.

The sulfide-based solid electrolyte used for this embodiment is the same as that described in the above-mentioned section of '1. First Embodiment'; therefore, the description herein is omitted.

(a) Liquid Hydrophobic Phase Transition Substance

The liquid hydrophobic phase transition substance used for this embodiment is mixed with the above-mentioned sulfide-based solid electrolyte, that is, it is contained inside the above-mentioned water-resistant electrolyte layer.

A material composing the liquid hydrophobic phase transition substance used for this embodiment is the same as that described in the above-mentioned section of 'A. Liquid hydrophobic phase transition substance'; therefore, the description herein is omitted.

The content of the liquid hydrophobic phase transition substance in this embodiment is not particularly limited as long as the above-mentioned sulfide-based solid electrolyte may be stably restrained from contacting with water, and the content may be the same as that described in the above-mentioned section of '2. Second Embodiment'.

(b) Electrolyte Layer

The electrolyte layer used for this aspect embodiment, namely, the water-resistant electrolyte layer, contains the above-mentioned liquid hydrophobic phase transition substance and sulfide-based solid electrolyte.

It is sufficient that the film thickness of such a water-resistant electrolyte layer has desired energy density without short-circuiting, and the layer may be the same as that described in the above-mentioned section of '3. Third Embodiment'.

A method for producing the water-resistant electrolyte layer of this embodiment is not particularly limited as long as the method is a method for mixing the above-mentioned liquid hydrophobic phase transition substance with the above-mentioned sulfide-based solid electrolyte so that the above-mentioned sulfide-based solid electrolyte may be stably restrained from contacting with water, and may adopt a method for mixing and compression-molding the above-mentioned liquid hydrophobic phase transition substance and the above-mentioned sulfide-based solid electrolyte using a known mixing method.

(2) Battery

The battery of this embodiment has the above-mentioned water-resistant electrolyte layer.

The battery of this embodiment is not particularly limited as long as the battery has at least the above-mentioned water-resistant electrolyte layer, and ordinarily it contains at least a pair of electrode layers and an electrolyte. Further, the battery ordinarily contains the above-mentioned current collector, separator and battery case.

Kinds of such a battery, a pair of electrode layers, an electrolyte, a current collector, a separator and a battery case are the same as those described in the above-mentioned section of '3. Third Embodiment'; therefore, the description herein is omitted.

C. Lithium Air Battery

A lithium air battery of the present invention comprises at least a water-resistant air cathode layer containing the above-mentioned liquid hydrophobic phase transition substance.

Such a lithium air battery is described while referring to drawings. As exemplified in FIG. 7, a lithium air battery 20 of the present invention comprises: an anode layer 1 containing an anode layer material 11 and a liquid hydrophobic phase transition substance 14 mixed with the above-mentioned anode layer material 11; a cathode layer (a water-resistant air cathode layer) 3 containing an electrode material 23 containing a conductive material and the liquid hydrophobic phase transition substance 14 mixed with the electrode material 23; an electrolyte 2 made of a nonaqueous liquid electrolyte, which is disposed between the anode layer 1 and the cathode layer 3; a separator 25 disposed between the above-mentioned electrodes; and a battery case 26 for storing these members.

Figure 7:
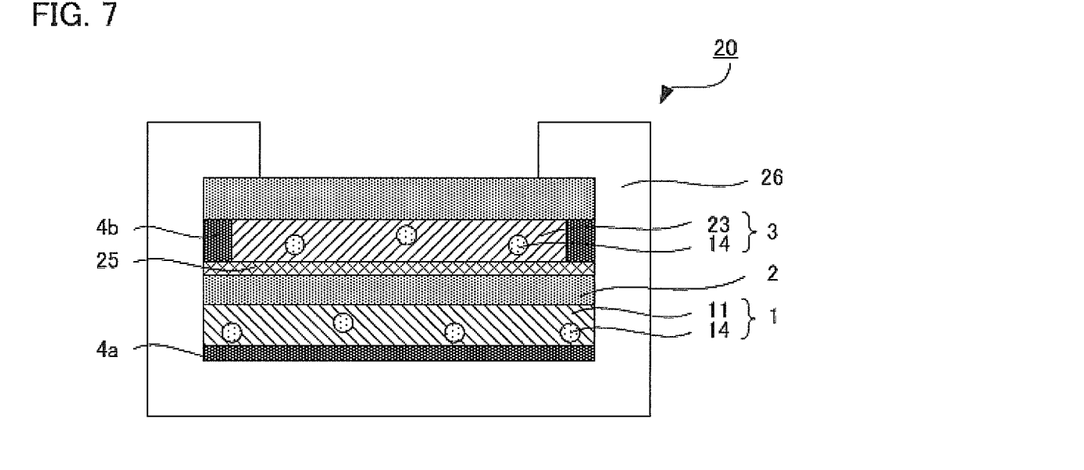
FIG. 7 is a schematic view showing an example of a lithium air battery of the present invention.

The reference numerals in FIG. 7 are the same as those in FIG. 1.

The air cathode layer (the cathode layer) in the above-mentioned air battery uses oxygen as a cathode active material, and produces a corona product such as $Li_2O$, $LiO_2$ and $Li_2O_2$ on the above-mentioned air cathode layer surface by discharge. Such a corona product causes a defect that it chemically changes into LiOH by reacting with water. Thus, according to the present invention, the above-mentioned air cathode layer is the water-resistant air cathode layer containing the above-mentioned liquid hydrophobic phase transition substance, so that the above-mentioned corona product may be restrained from contacting with water and the safety may become excellent.

The lithium air battery of the present invention has the above-mentioned water-resistant air cathode layer. Each constitution of the lithium air battery of the present invention is hereinafter described.

1. Water-Resistant Air Cathode Layer

The water-resistant air cathode layer used for the present invention contains the above-mentioned liquid hydrophobic phase transition substance. Further, the water-resistant air cathode layer ordinarily contains an electrode material.

(1) Liquid Hydrophobic Phase Transition Substance

The liquid hydrophobic phase transition substance used for the present invention is contained in the above-mentioned water-resistant air cathode layer, specifically, disposed on a surface of the above-mentioned water-resistant air cathode layer or mixed with an electrode material composing the above-mentioned water-resistant air cathode layer.

The constituent material, disposition location, film thickness and content of such a liquid hydrophobic phase transition substance are the same as those described in the above-mentioned sections of '1. First Embodiment' and '2. Second Embodiment' of 'B. Battery'; therefore, the description herein is omitted.

(2) Electrode Material

Another electrode material composing the above-mentioned water-resistant air cathode layer other than the above-mentioned liquid hydrophobic phase transition substance is used for the water-resistant air cathode layer used for the present invention.

Such an electrode material composing the water-resistant air cathode layer is not particularly limited as long as the electrode material produces the above-mentioned corona product, and it ordinarily contains at least a conductive material and additionally a binder for fixing the above-mentioned conductive material as required.

The above-mentioned binder may be the same as that described in the above-mentioned section of '1. First Embodiment' of 'B. Battery'; therefore, the description herein is omitted.

The above-mentioned conductive material is not particularly limited as long as the conductive material has conductivity, and examples thereof include a carbon material having a porous structure, such as mesoporous carbon, and a carbon material not having a porous structure, such as graphite, acetylene black, carbon nanotube and carbon fiber.

The content of the conductive material in the water-resistant air cathode layer in the present invention is preferably within a range of 65% by mass to 99% by mass, and above all within a range of 75% by mass to 95% by mass.

The conductive material used for the present invention preferably supports a catalyst. The reason therefor is that an electrode reaction is performed more smoothly. Examples of the above-mentioned catalyst include cobalt phthalocyanine and manganese dioxide. The content of the catalyst in the above-mentioned water-resistant air cathode layer is preferably within a range of 1% by mass to 30% by mass, and above all within a range of 5% by mass to 20% by mass.

(3) Water-Resistant Air Cathode Layer

The water-resistant air cathode layer used for the present invention contains the above-mentioned liquid hydrophobic phase transition substance.

The film thickness of such a water-resistant air cathode layer is not particularly limited as long as the film thickness has desired properties of the battery, and it is preferably within a range of 2 μm to 500 μm, and above all within a range of 5 μm to 300 μm.

A method for producing the water-resistant air cathode layer used for the present invention may be a method such that the above-mentioned liquid hydrophobic phase transition substance is contained so that the above-mentioned corona product may be stably restrained from contacting with water, and that the method described in the above-mentioned sections of '1. First Embodiment' and '2. Second Embodiment' of 'B. Battery' may be employed.

2. Lithium Air Battery

The lithium air battery of the present invention contains at least the above-mentioned water-resistant air cathode layer.

Such a lithium air battery uses a lithium ion as a metal ion and is not particularly limited as long as the lithium air battery contains the above-mentioned water-resistant air cathode layer, and it ordinarily contains at least a pair of electrode layers and an electrolyte.

Further, kinds of the lithium air battery of the present invention may be a primary battery or a secondary battery, and preferably a secondary battery among them. The reason therefor is that it is useful as a car-mounted battery, for example.

(1) Pair of Electrode Layers

A pair of electrode layers used for the present invention contains at least the above-mentioned water-resistant air cathode layer. In the present invention, the above-mentioned water-resistant air cathode layer is ordinarily contained as a cathode layer among the above-mentioned pair of electrode layers.

In the present invention, an electrode layer used for a general lithium air battery may be used as an anode layer among the above-mentioned pair of electrode layers. Specifically, the anode layer may be the same as that described in the above-mentioned sections of '1. First Embodiment' and '2. Second Embodiment' of 'B. Battery'.

(2) Electrolyte

An electrolyte used for a general lithium air battery may be used as the electrolyte used for the present invention. Specifically, the nonaqueous liquid electrolyte described in the above-mentioned section of '1. First Embodiment' of 'B. Battery' may be used.

(3) Others

The lithium air battery of the present invention comprises at least a pair of electrode layers containing the above-mentioned water-resistant air cathode layer and the electrolyte, and, ordinarily, it further comprises a current collector connected to the above-mentioned pair of electrode layers, a separator for preventing the contact between the electrodes, a battery case and the like. Ones used for a general battery may be used for such a current collector, a separator and a battery case; therefore, the description herein is omitted.

The present invention is not limited to the above-mentioned embodiments. The above-mentioned embodiments are exemplification, and any embodiment is included in the technical scope of the present invention if it has substantially the same constitution as the technical idea described in the claim of the present invention and exhibits similar operation and effect thereto.

EXAMPLES

The present invention is described more specifically while showing examples hereinafter.

Example 1

Lithiumbistrifluoromethanesulfonylimide (lithium salt) was dissolved in diethylmethylisopropylammoniumbistrifluoromethanesulfonylim ideas a hydrophobic salt under an Ar atmosphere so as to become a concentration of 0.8 mol/kg to produce an electrolyte.

Comparative Example 1

Lithiumbistrifluoromethanesulfonylimide (lithium salt) was dissolved in N-methyl-Npropylpiperidiniumbistrifluoromethanesulfonylimide as a hydrophobic ionic liquid under an Ar atmosphere so as to become a concentration of 0.32 mol/kg to produce an electrolyte.

Comparative Example 2

Lithiumbistrifluoromethanesulfonylimide (lithium salt) was dissolved in propylene carbonate as a hydrophobic organic solvent under an Ar atmosphere so as to become a concentration of 1 M to produce an electrolyte.

Example 2

The electrolyte of 125.6 mg produced in Example 1 and a sulfide-based solid electrolyte ($Li_2P_6S_{16}$, $Li_2S:P_2S_5=25:75$) of 130 mg were weighed and mixed, and the mixed electrolytes of 100 mg were pressed at a pressure of 4.3 $t/cm^2$ to produce pellets.

Comparative Example 3

A sulfide-based solid electrolyte ($Li_2P_6S_{16}$, $Li_2S:P_2S_5=25:75$) of 100 mg was pressed at a pressure of 4.3 $t/cm^2$ to produce pellets.

Example 3

Lithiumbistrifluoromethanesulfonylimide (lithium salt) was dissolved in tetraethylammoniumbistrifluoromethanesulfonylimide as a hydrophobic salt so as to become a concentration of 0.65 mol/kg to produce an electrolyte.

EVALUATIONS

1. Water Immersion Evaluation

Figure 8:
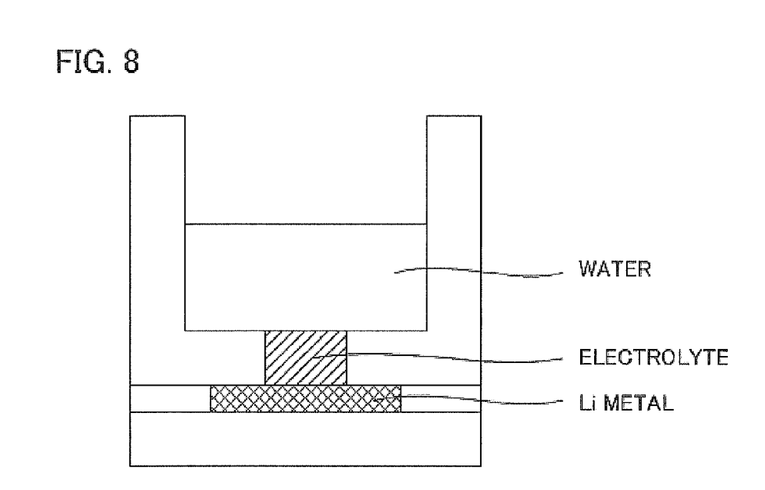
FIG. 8 is a schematic cross-sectional view of a cell used for evaluation in Example.

Each of the electrolyte produced in Example 1 and Comparative Examples 1 and 2 was taken out of an Ar atmosphere, disposed in a cell of a schematic cross-sectional view as shown in FIG. 8, and stood for one night in a state of contacting with $H_2O$ under the air. Thus, the state of the electrolyte before and after standing for one night was confirmed.

As a result, in Example, a white solid was produced by standing for one night under the air.

Further, in Comparative Example 1, the electrolyte was not solidified and was a liquid which phase-separated from water. Further, in Comparative Example 2, the electrolyte was a liquid which was uniformly dissolved in water.

Figure 9A:
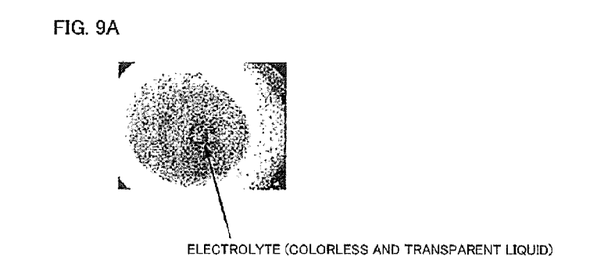
FIGS. 9A and 9B are each a photograph of an electrolyte produced in Example 1 before and after standing under the atmosphere.
Figure 9B:
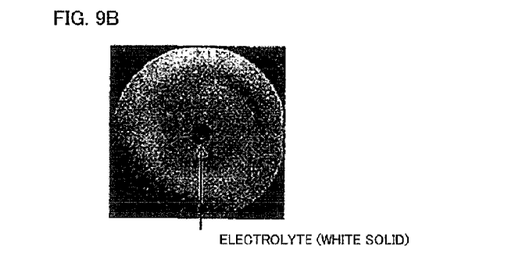

With regard to Example 1, a photograph before and after standing for one night under the air is shown in FIGS. 9A and 9B (FIG. 9A for before standing and FIG. 9B for after standing). These photographs show the top of the cell.

2. Hydrogen Sulfide Generation Amount Measurement

The pellets produced in Example 2 and Comparative Example 3 were put in a desiccator with a fan at a temperature of 24.9° C. and a humidity of 54 to measure the time dependence of hydrogen sulfide generation amount using a stopwatch and a hydrogen sulfide detector. The results are shown in FIG. 10.

Figure 10:
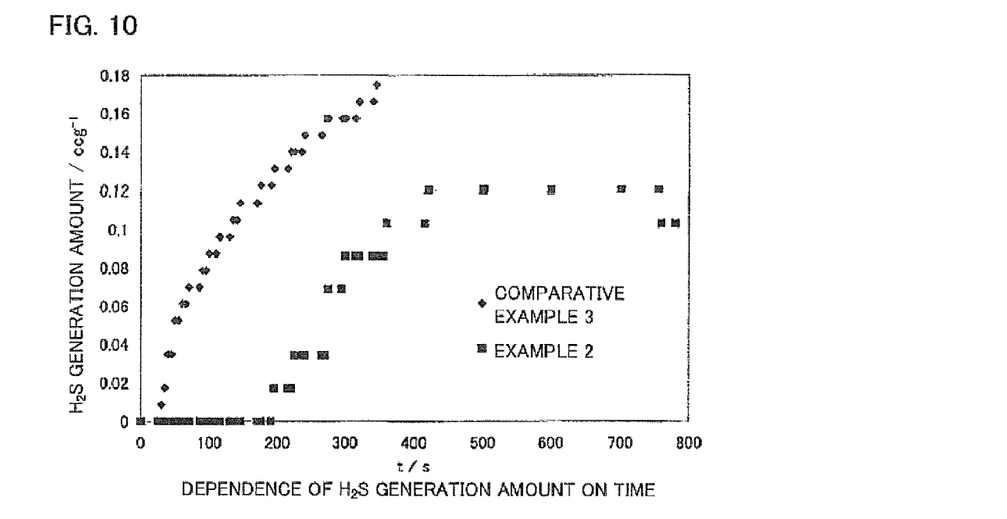
FIG. 10 is a graph showing the result of measuring a hydrogen sulfide generation amount.

As shown in FIG. 10, the pellets produced in Example 2 resulted in less hydrogen sulfide generation amount.

3. Li Conductivity Measurement

With regard to each of the electrolyte produced in Examples 1 and 3 and Comparative Example 1, Li conductivity was confirmed at a temperature of 60° C. and direct current polarization measurement by using a bipolar cell of Li/Li. The results are shown in FIG. 11.

Figure 11:
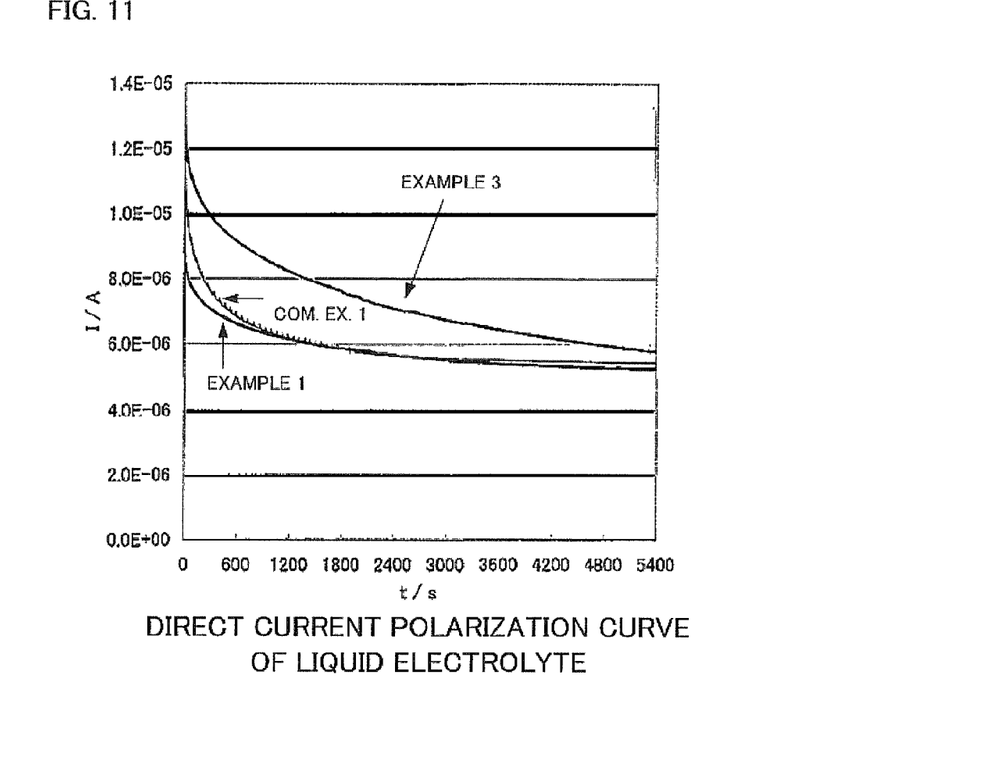
FIG. 11 is a graph showing the result of measuring Li conductivity.

As shown in FIG. 11, it was confirmed that the electrolyte (containing a liquid hydrophobic phase transition substance) produced in Examples 1 and 3 had equal level of Li conductivity to Comparative Example 1. Through the above, it was shown that the electrolyte was usable as a Li battery liquid electrolyte.

REFERENCE SIGNS LIST

1 . . . anode layer
2 . . . electrolyte
3 . . . cathode layer
4 . . . current collector
5 . . . sealing member
10 . . . battery
11 . . . anode layer material
12 . . . sulfide-based solid electrolyte
14 . . . liquid hydrophobic phase transition substance
20 . . . lithium air battery
23 . . . electrode material
25 . . . separator
26 . . . battery case

The invention claimed is:

1. A battery comprising at least one of (I) and (II), wherein:
(I) is an electrode layer containing (A) and (B),
  (A) is at least one of (A-1) and (A-2),
    (A-1) is an active material selected from the group consisting of metallic lithium, metallic sodium, metallic potassium and sulfur, for reacting with water,
    (A-2) is a sulfide-based solid electrolyte,
  (B) is a liquid hydrophobic phase transition substance comprising (B-1) and (B-2),
    (B-1) is a hydrophobic salt having a melting point of 80° C. or more
    (B-2) is a hydrophilic salt of an alkali or an alkaline earth,
  wherein in the case where water contacts with the liquid hydrophobic phase transition substance (B), the hydrophilic salt of an alkali or an alkaline earth (B-2) dissolves in water and the hydrophobic salt (B-1), which is in a solution state, phase-transits to a solid; and
(II) is an electrolyte layer containing (C) and (D),
  (C) is a liquid hydrophobic phase transition substance comprising (C-1) and (C-2),
    (C-1) is a hydrophobic salt having a melting point of 80° C. or more, (C-2) is a hydrophilic salt of an alkali or an alkaline earth, (D) is a sulfide-based solid electrolyte, wherein in the case where water contacts with the liquid hydrophobic phase transition substance (C), the hydrophilic salt of an alkali or an alkaline earth (C-2) dissolves in water and the hydrophobic salt (C-1), which is in a solution state, phase-transits to a solid.

2. The battery according to claim 1, wherein the electrode layer has the liquid hydrophobic phase transition substance (B) disposed on a surface thereof.

3. The battery according to claim 1, wherein the electrode layer has the liquid hydrophobic phase transition substance (B) mixed with an electrode material composing the electrode layer.

4. The battery according to claim 1, wherein the electrolyte layer has the liquid hydrophobic phase transition substance (C) disposed on a surface thereof.

5. The battery according to claim 1, wherein the electrolyte layer has the liquid hydrophobic phase transition substance (C) mixed with the sulfide-based solid electrolyte (D).

6. The battery according to claim 1, wherein at least one of the hydrophobic salt (B-1) or the hydrophobic salt (C-1) is diethylmethylisopropylammoniumbistrifluoromethanesulfonylirnide or tetraethylammoniumbistrifluoromethanesulfonylimide.

7. The battery according to claim 1, wherein a melting point of at least one of the liquid hydrophobic phase transition substance (B) or the liquid hydrophobic phase transition substance (C) in which the corresponding hydrophilic salt is added to the corresponding hydrophobic salt is 60° C. or less.

8. The battery according to claim 1, wherein a melting point of at least one of the liquid hydrophobic phase transition substance (B) or the liquid hydrophobic phase transition substance (C) in which the corresponding hydrophilic salt is added to the corresponding hydrophobic salt is 30° C. or less.

* * * * *